United States Patent [19]

Rupenian

[11] 3,941,075
[45] Mar. 2, 1976

[54] PEDAL POWERED AMPHIBIAN TRICYCLE WITH BLOWER-TURBINE COUPLING MEANS

[76] Inventor: Emanuel A. Rupenian, Lakeside Drive, Rockaway, N.J. 07866

[22] Filed: Mar. 12, 1975

[21] Appl. No.: 557,640

[52] U.S. Cl. ............... 115/2; 115/25; 180/66 B; 280/215; 280/216; 280/237
[51] Int. Cl.² ............................................. B60F 3/00
[58] Field of Search ........... 115/1 R, 1 A, 2, 25, 26; 180/1 P, 66 B; 280/212, 214, 215, 216, 237; 74/197

[56] References Cited
UNITED STATES PATENTS

| | | | |
|---|---|---|---|
| 657,124 | 9/1900 | Libbey | 180/66 B |
| 1,374,797 | 4/1921 | Zaborsky | 280/215 |
| 1,394,076 | 10/1921 | Gibbon | 180/1 P |
| 1,992,913 | 2/1935 | Hayden | 115/2 |
| 2,983,244 | 5/1961 | Young | 115/25 |

*Primary Examiner*—Trygve M. Blix
*Assistant Examiner*—Sherman D. Basinger
*Attorney, Agent, or Firm*—Anthony J. Casella

[57] ABSTRACT

A three wheeled amphibian vehicle operated by pedal power and including an air blower coupled to a disk turbine. The turbine is a flat circular rotatable structure having blade cavities on both upper and lower faces. Twin nozzles, connected to the blower, direct air streams toward the blades and form a coupling means which can be controlled to provide a variable speed ratio between the pedals and the driving wheel, thereby acting as a gear box including Drive, Neutral and Reverse. A spring coupled by a clutch mechanism to the driving shaft may be used to store energy while coasting down hill and then deliver the stored energy to the shaft when climbing up hill. Retractable pontoons are provided for traveling on water.

20 Claims, 16 Drawing Figures

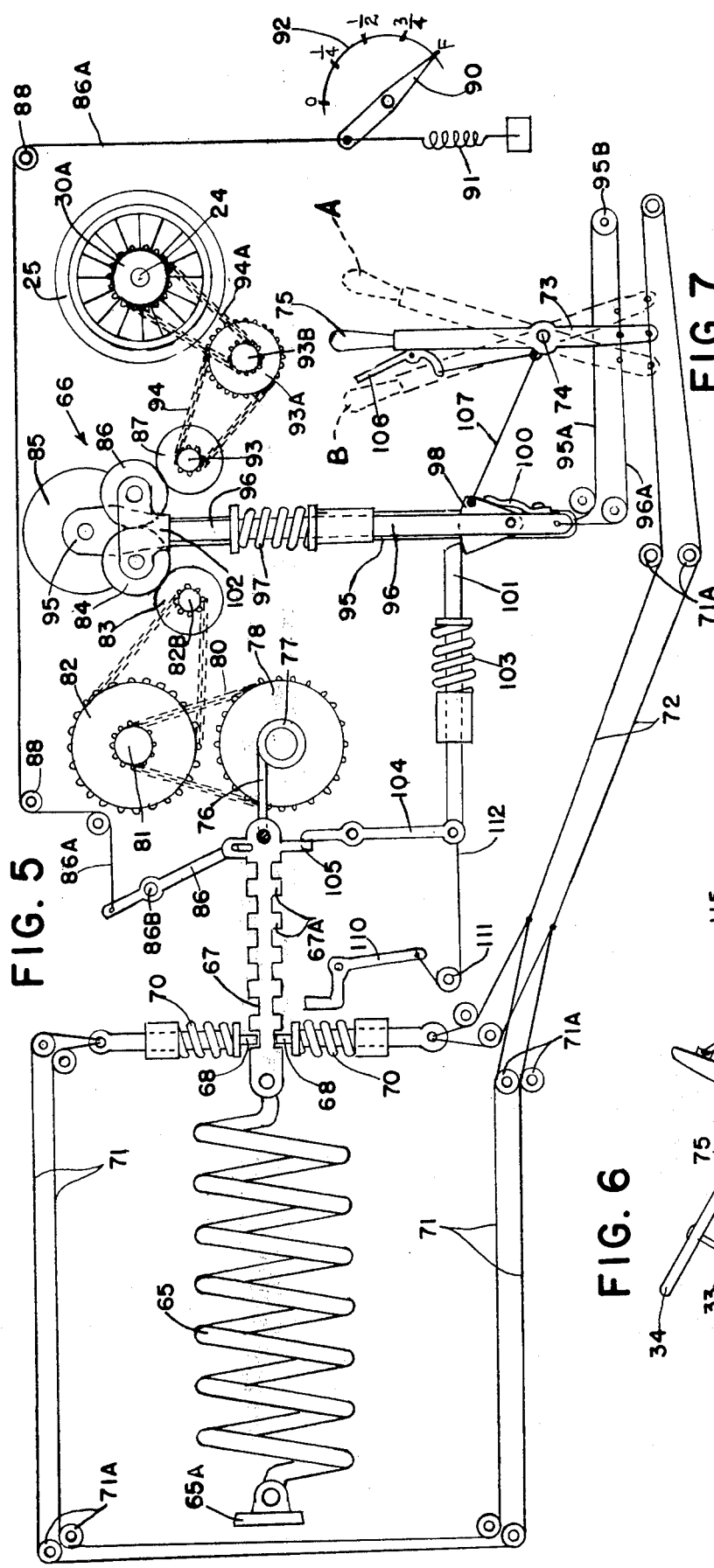
FIG. 5
FIG. 6
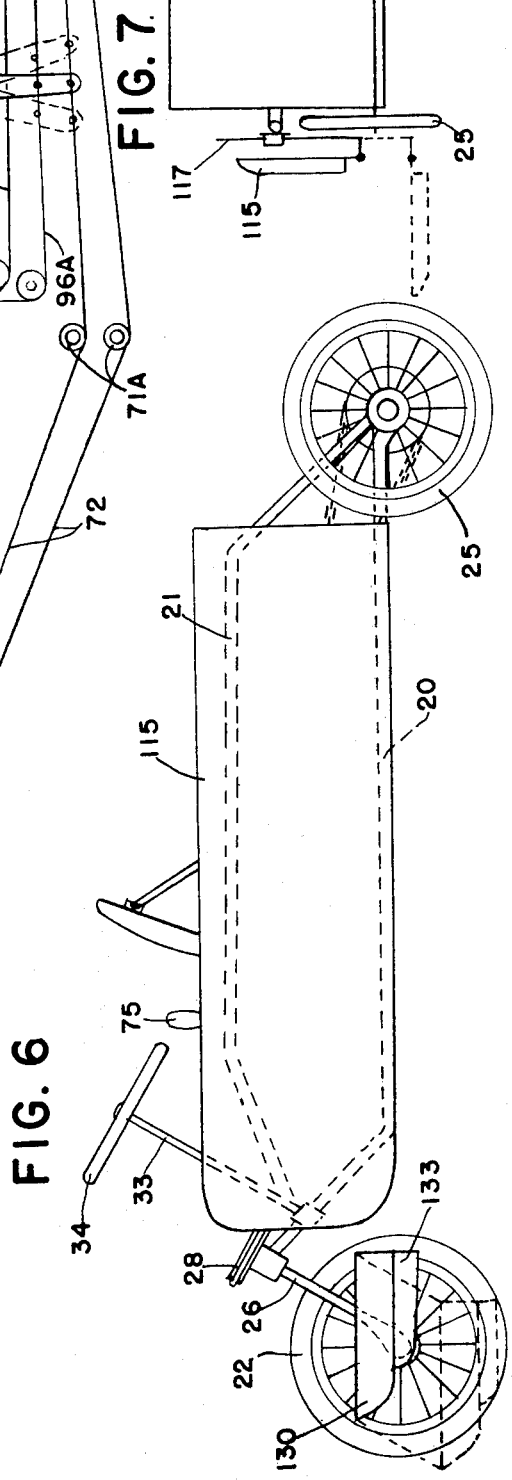
FIG. 7.

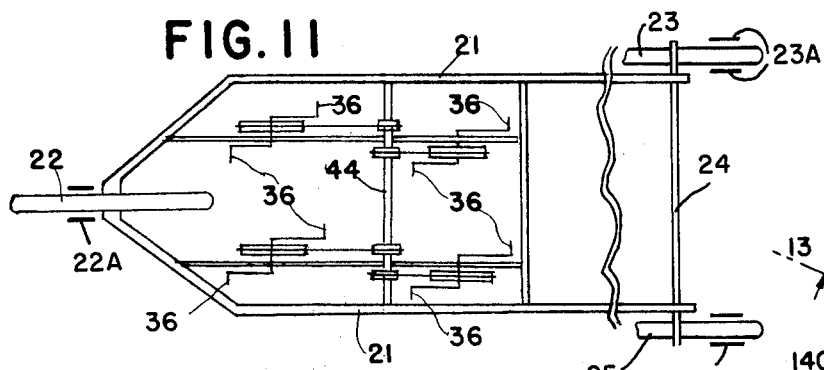
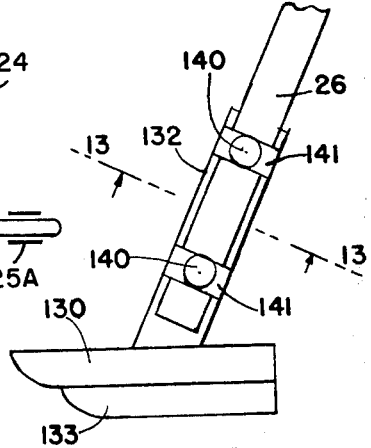
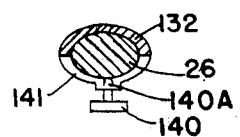
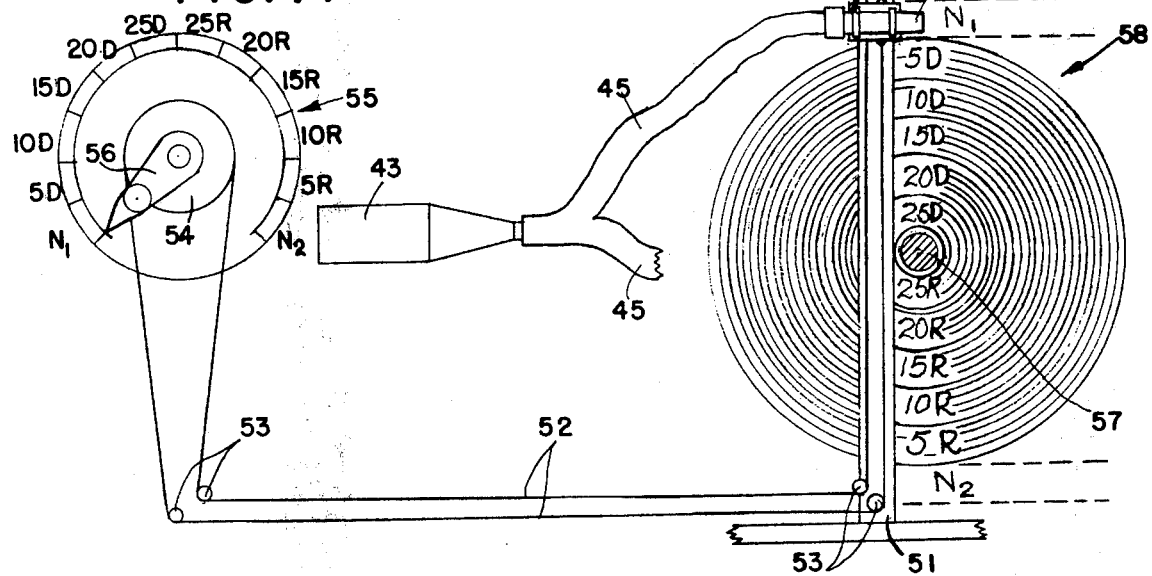
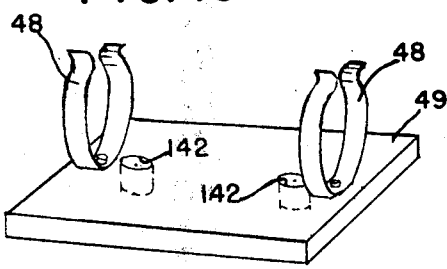
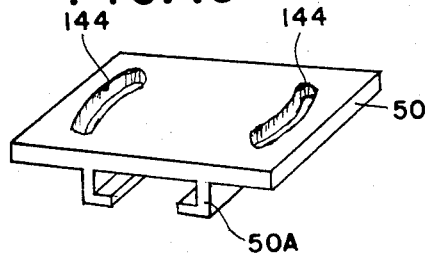

PEDAL POWERED AMPHIBIAN TRICYCLE WITH BLOWER-TURBINE COUPLING MEANS

BACKGROUND OF THE INVENTION

Both two and three wheeled vehicles have been used for some time for human transportation. Some of these units have been equipped with small gasoline engines but most have been pedal powered. One of the major problems associated with these vehicles is the mechanical ratio between the pedal crank arms and the driver wheels. A high ratio is desirable while traveling on smooth level ground and a much lower ratio is desirable while going up a hill. Some recent bicycles have been furnished with complicated speed changing gears but first, these speeds are limited and second, they do not provide a smooth change of coupling from one speed ratio to another.

One of the features of the present invention is à coupling unit which includes a blower-turbine with a transversely movable set of nozzles for continuous speed ratio settings and also for providing reverse and neutral.

Another feature of the invention is a spring storage device whereby energy can be stored in the spring while coasting down hill and then used as supplemental source of energy to propel the vehicle up hill.

Still another feature of the invention is the use of pontoons which are attached to both sides of the vehicle for use in traveling over water.

SUMMARY

The invention comprises a pedal powered vehicle having a single front wheel and two rear wheels and includes the following improvements: A rotary air blower coupled to the pedal crank arms and driven by them, thereby creating a continuous pressurized air stream; and a flat turbine wheel provided with reaction blade cavities and rotatably mounted on the vehicle. The turbine wheel is mechanically coupled to the rear axle which is fastened to the sole driver wheel for moving the vehicle. The invention also includes two nozzles connected to the air blower by a flexible double conduit and secured to a movable mounting means adjacent to the turbine reaction blade cavities for directing a stream of air to the cavities to turn the turbine wheel. The movable mounting means includes a transversely mounted rod for guiding the nozzles along a radius of the turbine wheel to vary the speed ratio between the pedal crank arms and the driver wheel and also to provide reverse and neutral.

The invention also includes a spring storage device which may be coupled in one manner to the driver wheel to stretch the spring and store energy therein. The spring may be coupled to the driver wheel in another manner and drive the wheel, releasing the stored energy.

Pontoons are adjustably added to the vehicle to permit moving on water.

Additional details of the invention will be disclosed in the following description, taken in connection with the accompanying drawings.

BRIEF DESCRIPTION OF THE FIGURES

FIG. 5 is a diagrammatic arrangement showing the storage spring and its control elements.

FIG. 6 is a side view of the vehicle with the pontoons folded to an upright position.

FIG. 7 is a diagrammatic rear view of the vehicle shown in FIG. 6, illustrating the pontoon positions.

FIG. 11 is a diagrammatic top view of a portion of the vehicle showing the relative positions of four pedal cranks in the version designed for four people, and also diagrammatically showing the location of conventional brakes, similar to a bicycle brake, on both versions (two as well as four people).

FIG. 12 is a side view of a portion of the vehicle showing how the front floats are secured.

FIG. 13 is a cross sectional view of the frame shown in FIG. 12 and is taken along line 13—13 of that figure.

FIG. 14 is a plan view (partly diagrammatic) of the turbine wheel, the top adjustable nozzle, and the manually operated control lever.

FIG. 15 is a perspective view of the supporting means for holding the nozzle which directs the flow of air to the turbine wheel.

FIG. 16 is a perspective view of the base portion of the nozzle support.

DESCRIPTION OF THE PREFERRED EMBODIMENT

Figure 1:
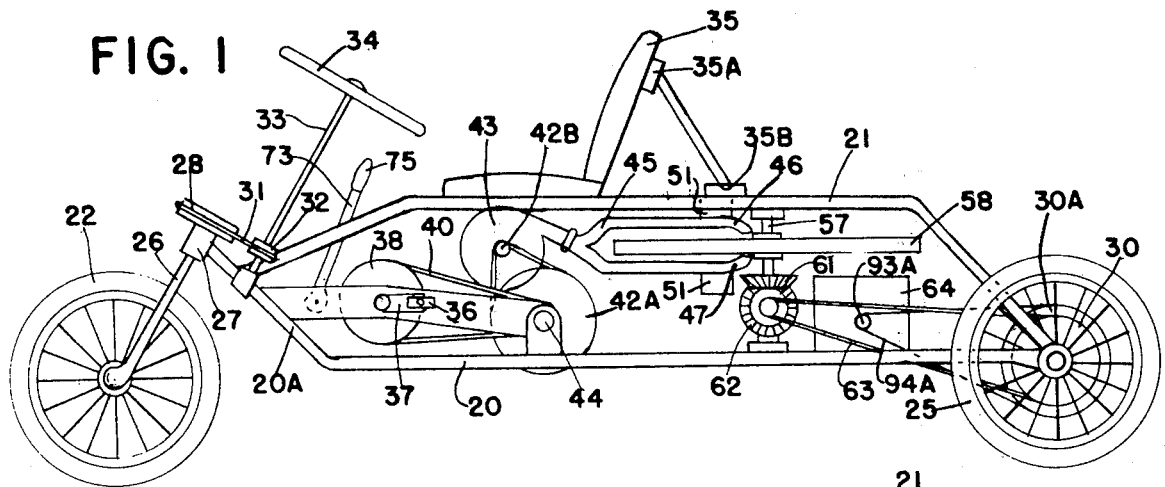
FIG. 1 is a side view of the vehicle without pontoons, to show the driving devices.
Figure 2:
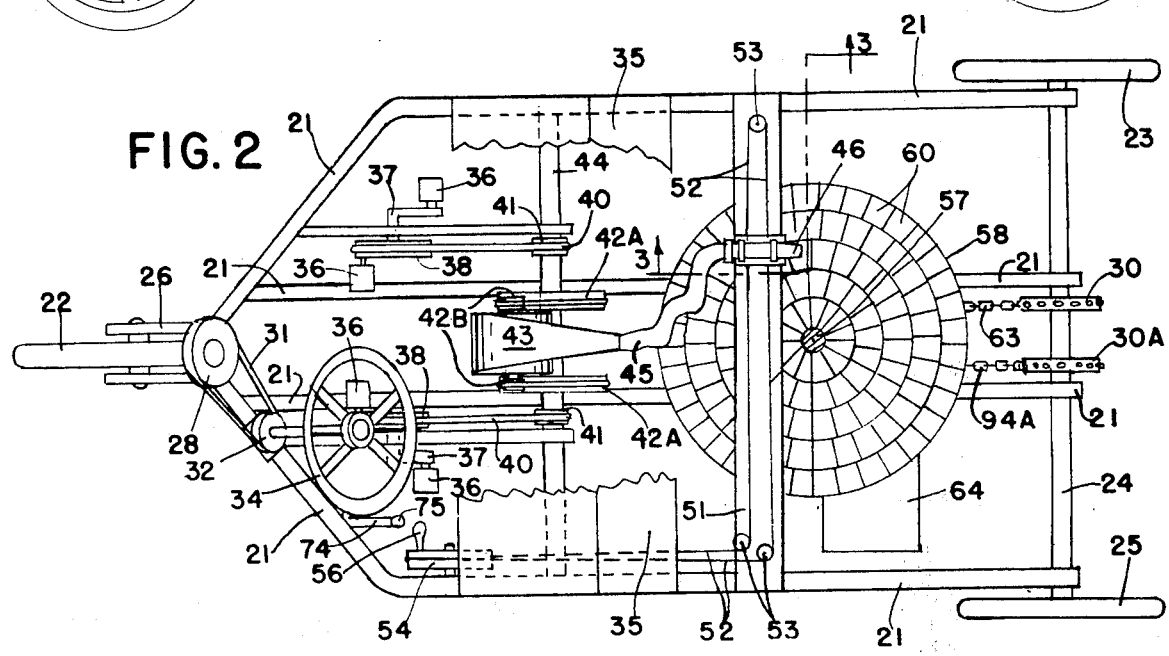
FIG. 2 is a top view of the vehicle with part of the seats and the frame members broken away to show the details of the air blower and its coupling.

Referring now to FIGS. 1 and 2, the vehicle includes a body of tubular members with base member 20, upper twin members 21, a front wheel 22, and two rear wheels; a driver wheel 25 fastened to the shaft 24 and a free-wheel 23.

The front wheel 22 is supported in a fork 26, rotatable within a bearing 27, and connected to a pulley 28. The bearing 27 is secured to the ends of bent-up portions 20A of the base members 20. The rear wheel 25 is secured to a transverse shaft 24 connected to a drive sprocket wheel 30. Pulley 28 is connected by a belt 31 to a similar pulley 32 secured to a steering column 33 terminated by a steering wheel 34. Two individual seats 35 are mounted one on each twin branches of upper members 21, by means of pivotal and movable joints 35A, 35B; joint 35B is fastened on members 21 by screws. The joints 35B permit the adjustment of the seats independently for each passenger either by its approach or by its retraction from the crank arms, while joints 35A, operated at the same time, permit the change of the incline of its back.

The vehicle is powered by two sets of pedals 36 secured to crank arms 37. A pulley 38 is fastened to crank arms 37 and drives a belt 40, a pulley 41, secured to shaft 44, another set of pulleys 42A and 42B and a centrifugal air blower 43. The shaft 44 is so coupled that it goes on turning even after the driver stops to pedal, in the same manner as the free-wheel of a bicycle. The blower 43 has its output port connected to a flexible double conduit 45 one portion of which is connected to an upper nozzle 46, the other portion being connected to a lower nozzle 47. The nozzles 46, 47 are mounted by the clamps 48 on sliding members 49 and 50 which partially enclose rods 51 (see FIG. 3) extending transversely across the vehicle and secured at their ends to members 21. The nozzles 46, 47 are controlled by wires 52 threaded around pulleys 53, and terminated at a control pulley 54 (FIG. 2), which is provided with a circular scale 55 indicating the neutral, drive, and reverse zones and also the level of each speed of the turbine wheel (see FIG. 14). The control pulley 54 is manually operated by a lever 56 to move the nozzles along rods 51 towards the periphery or to the center of the turbine: thereby changing its speed ratio and therefore the speed of the vehicle. Passing from the zone D to the opposite side of shaft 57, the nozzles also change the direction of rotation of the turbine wheel, therefore providing reverse.

The flat turbine wheel 58 is mounted on a vertical shaft 57, rotatable between the nozzles 46, 47, and their mounting rods 51 (FIG. 2). The turbine wheel 58 contains a plurality of reaction blade cavities 60 (FIG. 2) arranged in 25 circles around the shaft 57. Each cavity is identical to all other cavities and the number of cavities in any circle is proportional to the distance of the circle from the shaft. The nozzles 46, 47 direct blasts of air into the cavities 60 and force the turbine 58 to turn. Shaft 57 also carries a bevel gear 61 meshing with another bevel gear 62 and driving a chain 63 which engages sprocket wheel 30 on shaft 24 (FIG. 2).

Movement of the nozzles 46, 47 along a radius of the turbine wheel 58 alters the speed ratio between the pedal crank arms and the driving wheel 30. When the nozzles 46, 47 are close to shaft 57, the speed ratio of the turbine is the highest and the maximum speed of the driving wheel results. As the nozzles are moved toward the pheriphery of the turbine wheel 58 a greater number of cavities pass under the nozzles for each revolution of the turbine wheel and the speed is correspondingly reduced. The lowest speed ratio is obtained when the nozzles are over the peripheral cavities. When the nozzles are placed in any of the zones marked $N_1$ or $N_2$ (FIG. 14), the turbine wheel remains at rest since the blasts of air overpass its periphery; this is the equivalent of neutral of a conventional gear box. The zones D are the equivalent of forward drive, and the zones R, the equivalent of reverse. When the nozzles are moved from the zone D into the Zone R, the turbine 58 turns in opposite direction and backs up the vehicle. In addition to its main function of a gear box including neutral and reverse, the arrangement of movable nozzles-turbine taken as a unity, acts also as an emergency brake; when the nozzles are removed from a zone to the opposite side, the turbine wheel, before going on turning opposite direction, first slows down, whence there results an automatic braking action. This situation does not exclude the need of conventional brakes, similar to a bicycle brakes (see FIG. 11, elements 22A, 23A and 25A) which still are needed to equip the vehicle. Due to its high speed, the turbine also acts similarly to a gyroscope working in a horizontal level, thereby improving the stability of the vehicle on sharp curves and reducing the danger of overturn.

Figure 3:
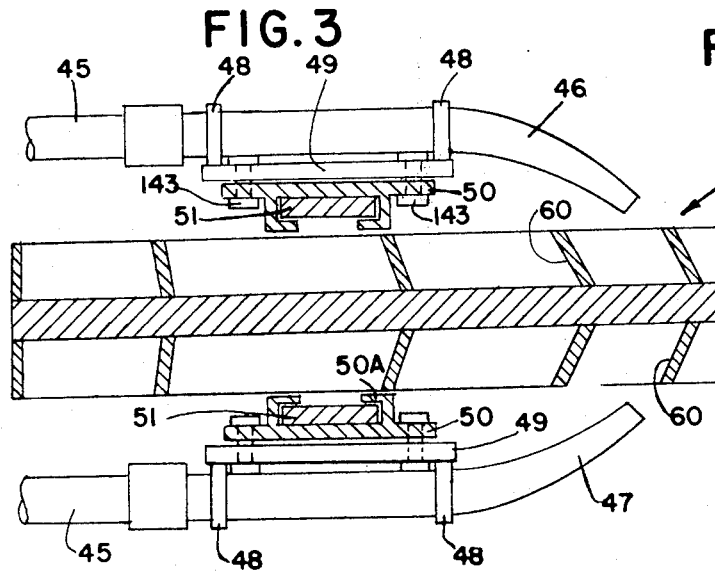
FIG. 3 is a cross sectional diagram, to an enlarged scale, of the turbine wheel and the twin nozzles, this section taken alone line 3—3 of FIG. 2.

FIGS. 1, 2 and 3 show the vehicle in its simplest form, arranged for land travel only and without showing the details of the storage means 64 which is shown as a box in FIGS. 1 and 2. FIG. 5 is a diagram showing a storage spring 65 coupled to the sprocket wheel 30A and driving shaft 24 by a reversible set of clutch wheels 66 so that the storage spring 65 can be extended when coasting down a hill and then used to supplement the pedal power when climbing a hill. The storage spring 65 is secured to a portion 65A of the vehicle at one end while the other end is fastened to a notched bar 67 for holding the spring 65 in any one of a number of storage positions. The notches 67A in bar 67 are engaged by tongues 68 which are resiliently urged by springs 70 into notches 67A. The tongues 68 may be pulled from the notches 67A by wires 71 secured to end portions of the tongues. Wires 71, threaded through a number of pulleys 71A, are joined to wires 72 and connected to the lower portion of a control lever 73 in such a manner that the tongues 68 are withdrawn from notches 67A whenever the lever is moved out of its neutral position. Lever 73 is movable about a pin 74 and has a handle 75 for manual operation.

The other end of notched bar 67 is connected to a flexible cord 76 which can be wound on a take-up spool 77. The take-up spool 77 is fastened to a sprocket wheel 78, coupled by a chain 80 to another set of sprocket wheels 81, 82 and 82B as speed reducing/amplifying gears, and finally to clutch roller 83. The clutch roller 83 is long enough to drive any one of clutch wheels 84, 85, and has a resilient surface provided by a covering of leather or fabric. The notched bar 67 is also coupled to a leger 86 by a pin and slot connecting means 86B, the upper end of the lever 86 being connected to a wire 86A. Wire 86A is threaded through a number of pulleys 88 and terminated by an indicator 90 and a take-up spring 91. The indicator 90 and its scale 92 are mounted in front of the driver so that he can determine the condition of the spring 65.

Figure 4:
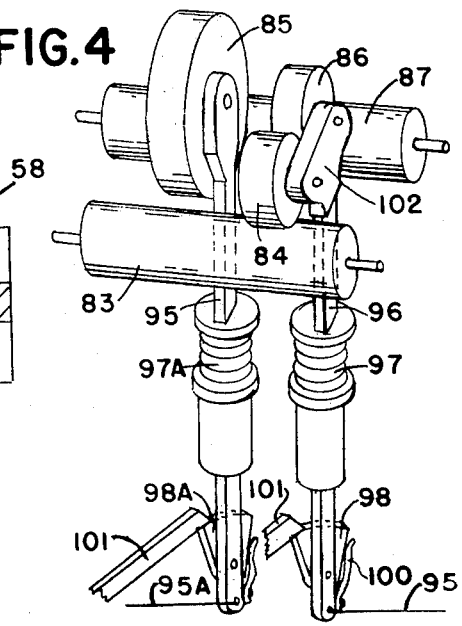
FIG. 4 is a perspective view diagrammatically representing the clutch wheels and the rollers which alternately couple the storage spring to the driver wheel.

Clutch roller 83 is matched by a similar roller 87 (FIG. 5) constructed in the same manner and coupled through a set of sprocket wheels 93, 93A, and 93B, to sprocket wheel 30A and shaft 24 by chains 94 and 94A. Rollers 83, 87 may be connected to each other by either one of two roller systems. In order to make the rollers 83, 87 turn in the same direction, a large clutche swheel 85 is lowered to make contact with both clutch rollers 83, 87. The position of clutch wheel 85 is controlled by a vertical supporting member 95 secured to an operating wire 95A, the other end of which, after being threaded around pulley 95B, is connected to the bottom of lever 73. The member 95 is identically constructed as member 96 and has the same, but individual, auxiliary components: (see FIG. 4) a spring 97A, a latch 98A, a leaf spring 100A; it is also lowered by its lower end, and is kept in a contact position with rollers 83, 87 by the same pawl 101, broad enough to catch alternately any of two latches 98, 98A. Since member 95 and its auxiliary components including wire 95A are placed on the opposite side of member 96, in FIG. 5, member 95 is only diagrammatically represented. In order to make the roller 87 turn in opposite direction than roller 83, the large clutch wheel 85 is disengaged and two smaller clutch wheels 84, 86 are lowered to make contact with the clutch rollers as indicated in FIGS. 4 and 5. Rollers 84, 86 are held in frictional contact with each other by T-shaped linkage bar 102 which is coupled to a vertical control bar 96, resiliently holding clutch wheels 84, 86 out of contact with rollers 83, 87 by the spring 97, except when latched into contact position by a latch 98. Latch 98 is engaged by a pawl 101 resiliently urged by spring 103 and connected by linkage 104 to a projection 105, formed as an integral part of the notched bar 67. Latch 98 is rockably mounted on bar 96 and urged to remain in the position shown in FIG. 5 by a leaf spring 100. Latches 98, 98A are also coupled to an auxiliary lever 106 on control lever 73 by a wire 107.

The operation of the storage spring 65 of the auxiliary components and of its controlling means is as follows: Let it be assumed that both latches 98, 98A are higher up than the pawl 101, and the springs 97, 97A are in their relaxed position, thereby the clutch wheels 84, 85 and 86 being out of contact with rollers 83, 87. If the vehicle now approaches a sharp decline, the driver can coast down and store energy in the spring by moving the lever 73 to the position A shown in dotted lines, but without operating the auxiliary lever 106. This action shifts wires 72, 71 to pull the tongues 68 from their notches and permit the free movement of the notched bar 67 and spring 65. Moving lever 73 to position A also releases wire 96A with no effect on rod 96 and wheels 84, 86, which are already out of contact with rollers 83, 87; At the same time, pulling control wire 95A, lowers supporting member 95 to compress the spring 97A and put the large wheel 85 into engagement with rollers 83, 87 so that the motion of the rear wheel 25 is transmitted through sprocket wheels 82B, 82, 81 and 78 to take-up spool 77 to turn and real in the flexible rope 76. This action, moving the notched bar to the right as shown in FIG. 5, expands the storage spring 65, storing energy in the spring.

When the supporting member 95 is lowered by the action of wire 95A, member 95 is latched into its operating position by a latch 98A similar to latch 98, a leaf spring 100A similar to spring 100 and by pawl 101, the latch and spring components lying on the other side of member 96 the hill is a short one and the storage spring was not fully extended, the operator must restore lever 72 to its original neutral position, thereby releasing by wires 72, 71 and springs 70, the tongues 68 into notches 67A and clamping the storage spring 65 in its partially extended position. When lever 73 is moved to its neutral position, the auxiliary lever 106 must also be operated. By this action the latch 98A is pulled out and the member 95, disengaged from pawl 101, is moved upwardly by the spring 97A so that the large clutch wheel 85 is disconnected from rollers 83, 87. At this moment the energy storing device is disconnected and the stored energy is kept in reserve. If the vehicle is moving down a long hill and the energy storing device has moved the storage spring to its maximum extended position, extension 105 on the notched bar 67 engages the upper end of lever 104, withdrawing pawl 101, disengaging latch 98A, and automatically permitting the moving of the clutch wheel 85 back to its disengaged position, by the resiliency of the spring 97A. At the same time the wire 95A pulls the lever 73 back to its neutral position thereby moving by wires 72, 71 tongues 68 into notches 67A and clamping the storage spring in its fully extended position. Again the energy storing device is disconnected, automatically this time, and the stored energy is kept in reserve.

Now, if the vehicle starts up a hill and the operator desires to use the stored energy, the control lever 73 is moved to the position B shown in dotted lines, but without operating the auxiliary lever 106. This movement, by wire 96A lowers rod 96, engages the pair of clutch wheels 84, 86 with rollers 83, 87 and also by wires 72, 71 removes the tongues 68 from the notches 67A; at the same time it releases the wire 95A with no effect on rod 95 and clutch wheel 85 which is already out of contact with rollers 83, 87. The storage spring 65 now pulls the notched bar 67 to the left. Following this movement, the flexible rope 76 turns the take-up spool 77 and sprocket wheels 78, 81, 82 and 82B. The clutch wheels 84, 86 are engaged with rollers 83, 87 and turn sprocket wheels 93, 93A, 93B, 30A, and finally the driver wheel 25, the stored energy being used. It should be noted that this spring action is working at the same time the operator is applying force to the pedals, so that the spring action is only in the nature of an assist.

If the hill is a short one and the stored energy was only partially used, after climbing up, the driver must restore the lever 73 to its original neutral position permitting tongues 68 to move into notches 67A and clamping the storage spring 65 in its partially extended position. At the same time the driver must also operate the auxiliary lever 106 which removes latch 98 from pawl 101 and permits the resiliency of spring 97 to disengage the pair of clutch wheels 84, 86. If the vehicle is climbing a long hill and the spring 65 has released all of the stored energy, extension 105 on the notched bar 67 engages the upper end of lever 110 and by means of pulley 111 and wire 112, withdrawing pawl 101, permit the pair of clutch rollers 84, 86 to be moved back in their disengaged position by the resiliency of spring 97.

Figure 8:
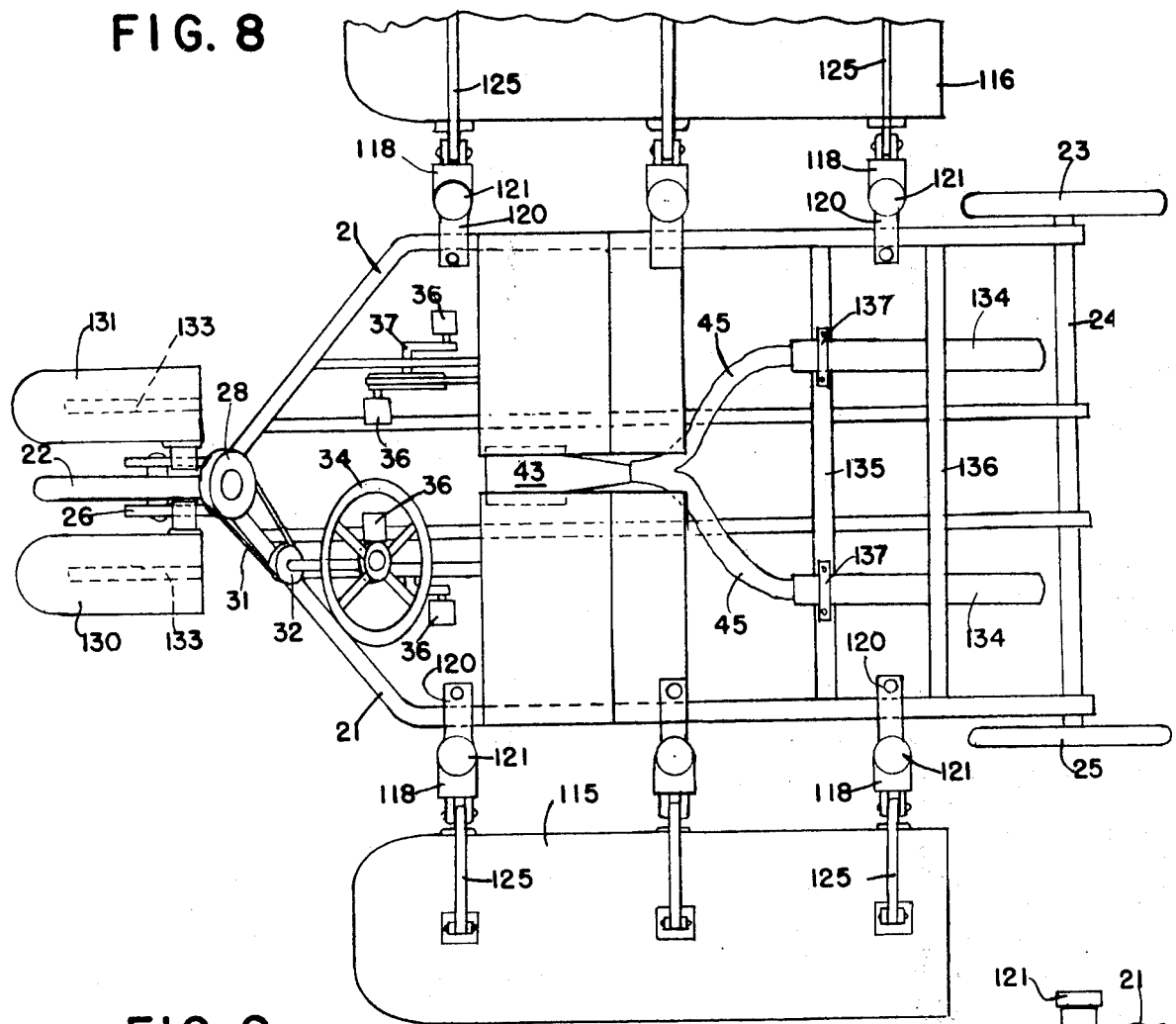
FIG. 8 is a top view of the vehicle with the pontoons in their lowered position and the blower nozzles immersed in water.
Figure 9:
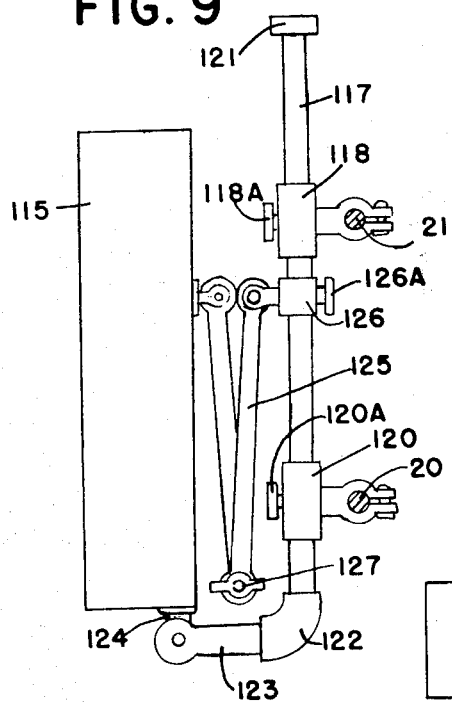
FIG. 9 is a detailed rear view of one pontoon in its raised position.
Figure 10:
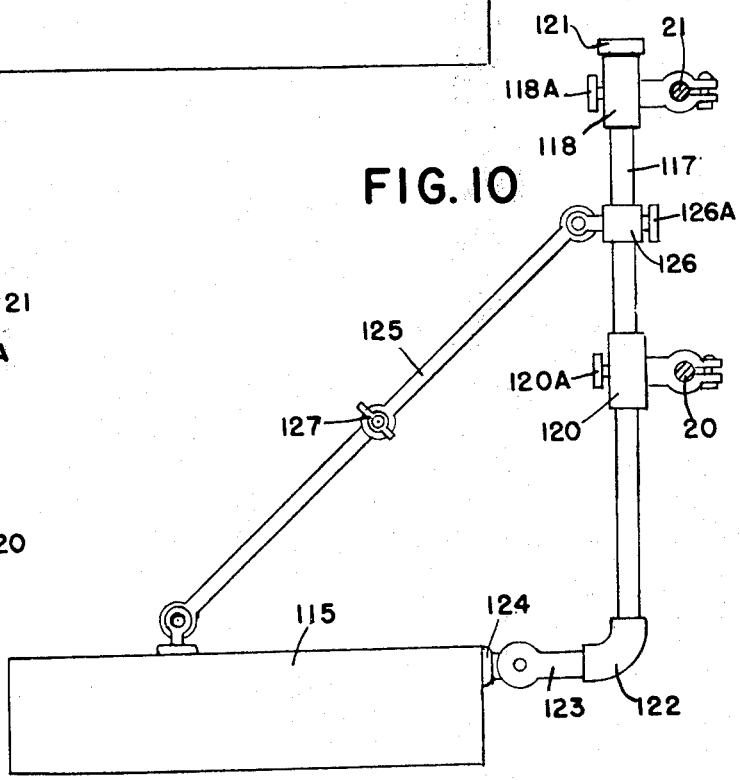
FIG. 10 is a view of the pontoon shown in FIG. 9 but in its lowered position.

FIGS. 6 through 11 show another variation of the components which are used in the above described vehicle. Two principal pontoons 115 and 116 are permanently attached to the supporting tubular members 20 and 21, and can be lowered as shown (FIGS. 7, (dotted lines) 8 and 10), or secured in an elevated position (FIGS. 7, 9). The detailed type of float securing means is shown in FIGS. 9 and 10. Three slidable vertical rods 117 are mounted on each side of the vehicle and secured in hollow cylindrical fixtures 118 and 120, bolted to supporting members 20 and 21 of the vehicle. A cap 121 is provided for the upper end of each rod 117 so that the rods can never slip through their fixtures into the water. The caps 121 can be unscrewed from the rods 117, so that the entire floating components can be removed from the body of the vehicle, if so desired. At the bottom of rod 117 an angular fixture 122 is provided for supporting a hinged member 123 at a distance from the sides of the vehicle. A bracket 124 is rotatably secured to member 123 and is screwed or bolted to the floats 115 and 116. A reinforcing hinged member 125, attached by fixture 126 on members 117, is used to maintain the floats either in an upright position (FIG. 9) or in their operating position (FIG. 10). This type of hinge can be opened easily and, when properly secured by screw 127, can hold the floats in the desired position. All floats are kept in an upright position when traveling on land (FIG. 7). To prepare the vehicle for traveling on water, first, by loosening the screws 120A and 118A the rods 117 must be lowered (FIG. 10) until the cap 121 reaches the fixture 118, when the screws 120A and 118A must be tightened again. Then, by loosening the screws 127 and 126A, the float 115 is laid in its operating position, whereupon the screws 127 and 126 are tightened again.

In addition to principal floats 115 and 116, two supplemental front floats 130 and 131 are provided for side of the wheel 22 (see FIG. 8). Mounted on the fork 26 by means of slidable members 132 (see FIGS. 12 and 13), the floats 130 and 131, each provided at their bottom with a directional keel 133, are used for two purposes. Directed by the steering wheel 34 through the rod 26 ensure, by their wings, the direction of the vehicle; while through their body, plunged in water gradually, ensure the horizontal plane of the vehicle adapting the buoyancy of the front end to the various weights of passengers. It should be noted that the center of buoyancy of the vehicle is, for technical reasons, situated behind the center of gravity; thereby a want of balance is created. The state of balance is ensured by the front floats.

FIG. 8 shows both branches of the double conduit 45 provided with long nozzles 134 and plunged directly into the water. In this position the conduits are secured on cross pieces 135 and 136 by means of clamps 137. When the air blower 36 operates, it sends a jet of pressurized air into the water, thereby moving the vehicle by reaction.

The diagram in FIG. 11 indicates how the vehicle may be designed to accommodate four sets of pedals 36 for four occupants. The pedals 36 are coupled together by flexible belts to turn shaft 44.

FIG. 12 is a side view of one of the supporting means 132 for the forward floats 130, 131, each with a directive keel 133. The supporting means 132 (see FIG. 13) is a channel which fits around one side of the fork member 26. It is held by metallic collars 141 and is secured in place by a hand screw 140, working in a threaded hole 140A.

FIG. 14 is a diagramic view of the blower system ending in nozzles 46 and 47 (see also FIG. 3). When handle 56 is turned to either $N_1$ or $N_2$ the nozzles are beyond the periphery of the turbine wheel and cannot exert any force on it. This position corresponds to the neutral position in modern automotive vehicles. The turbine nozzle position at the circumference is designated 1D for "first speed forward." Other circular positions on the same radius are given other speed designations up to 25D the highest coupling speed obtainable. As the nozzles are moved beyond the axis 57 of the turbine wheel, there results a reverse coupling designated 25R to 5R. The couplings 25R to 5R are assigned to be used as a progressive emergency brake during the motion forward of the vehicle, while the couplings 5R to 1R are assigned to be used as reverse coupling. All designations are printed on the control dial 55 for the convenience of the operator.

FIGS. 15 and 16 show the details of the supporting plates 49 and 50 which hold the nozzles in position. The clamps 48 are secured to a top plate 49 having two holes 142 for bolts 143 (FIGS. 3 and 15). Plate 49 is mounted on plate 50 and secured thereto by the bolts 143 passing through curved slots 144 (see FIG. 16). This arrangement is necessary so that the direction of the nozzles may be adjusted to provide the most efficient operation directing the air stream strictly perpendicular to the radius of turbine wheel. Channel bars 50A are secured to the bottom of plate 50 for guidance on transverse rod 51.

The above described vehicle is not only an efficient means of transportation on both land and water; it is also comfortable, safe, and has provision for at least two passengers, offering the choice to be easily designed also for four passengers by the addition of two more seats and two more pedals.

Fit to go anywhere with youngsters as well as with older people it connects the pleasure to utility and to savings.

The operation of this fuel-saving vehicle is devoid of polution, creates a minimum of noise and induces and maintains a good health and good shape of operators.

The embodiments of the invention in which our exclusive property or privelege is claimed are defined as follows:

1. In a pedal powered amphibian vehicle equipped with conventional brakes and having a single front wheel and two rear wheels from among only one is a driving wheel; the improvement comprising: a rotary air blower coupled to pedal crank arms and driven by them for creating a continuous pressurized air stream; a flat turbine wheel provided with reaction blade cavities and coupled to the rear driver wheel for turning it and thereby moving the vehicle; two nozzles connected to said air blower by a flexible double conduit and secured to a movable mounting means adjacent to the turbine reaction blade cavities for directing a stream of air to the cavities to turn the turbine wheel; said movable mounting means including a transversely mounted rod for supporting the nozzles as they are moved along a radius of the turbine wheel to vary the speed ratio between the pedal crank arms and the driver wheel.

2. A vehicle as claimed in claim 1 wherein said turbine wheel is provided with reaction cavities on both the upper and lower faces and wherein two nozzles are connected to the blower, one nozzle adjacent to the upper blade cavities and the other nozzle mounted adjacent to the lower blade cavities.

3. A vehicle as claimed in claim 2 wherein a pair of wires are fastened to said nozzles and coupled to a manual control pulley for moving the nozzles along the transverse rod to vary the speed ratio between pedals and driver wheels, and to provide neutral and reverse; said control pulley having a circular scale indicating neutral, drive and reverse zones, and also the level of each blade cavities channel.

4. A vehicle as claimed in claim 1 wherein two sets of pedals are mounted on the vehicle for use by two passengers, both of said pedal sets mounted on crank arms and coupled by an intermediary set of pulleys to a free-wheeled shaft which is connected to the air blower; said vehicle offering the choice to be easily designed also for four passengers by the addition of two more seats and two more pedals connected to the same shaft.

5. A vehicle as claimed in claim 4 wherein two individual seats are mounted on the vehicle by means of movable pivotal joints, said joints permitting either the approach or retraction of each seat independently from the crank arms as well as the change of the incline of its back.

6. A vehicle as claimed in claim 1 wherein a storage spring is mounted on the vehicle, one end of the spring secured to the vehicle, the other end of the spring secured to a notched rod for controlling the movements of the spring, and including a pair of tongues resiliently adapted to fit in notches of the rod for retaining the storage spring in a storage position; said tongues comprising a manually operable lever and control wires leading from the lever to the tongues.

7. A vehicle as claimed in claim 6 wherein said notched rod is coupled to a reversible clutch for storing energy in the spring at one setting of the clutch, and for delivering the energy so stored at another setting of the clutch.

8. A vehicle as claimed in claim 7 wherein a control means for operating said reversible clutch includes a manually operable lever and control wires leading from the lever to the clutch; said clutch comprising a first clutch roller coupled to a storage spring, and a second clutch roller mounted adjacent to the first and coupled to the driver wheel; a single clutch wheel for engaging the first and second clutch rollers to transmit power from the driver wheel to the storage spring to store energy therein; and a double set of clutch wheels also engaging the first and second clutch rollers to transmit power from the storage spring to the driver wheel; said clutch wheels including a resiliently adapted rod held in operating position by a coupling means comprising a leaf spring, a manually operable latch and a pawl.

9. A vehicle as claimed in claim 7 wherein a control means for operating automatically said reversible clutch includes a latch kept in operable position by a pawl urged by a spring, and setting the clutch either to store or deliver energy; and a system of two linkages connected to said pawl and driven by a projection of said notched bar, automatically retracting the pawl and disconnecting said clutch when the storage spring is either fully extended or completely released.

10. A vehicle as claimed in claim 7 wherein said reversible clutch is coupled to both the notched rod and to the driver wheel by identical sprocket wheel means which operate as speed amplifying and reducing gears.

11. A vehicle as claimed in claim 6 wherein an indicating means, including a pointer and a dial, are mounted in front of the driver for indicating at any time the elongation of the storage spring.

12. A vehicle as claimed in claim 1 wherein a pair of principal floates are attached to the sides of the vehicle by means of retractable pivotal rods, said floats being first lowered and then laid to a flotation position whenever the vehicle is used to travel on water; and further including a supplemental pair of floats, provided with directional wings, and attached to each side of the frontal wheel by means of retractable rods, which are lowered to a flotation position when traveling on water, in order to ensure both the direction of the vehicle and its horizontal plane.

13. A vehicle as claimed in claim 12 wherein said flexible double conduit is retracted from said nozzles and is positioned beneath the surface of the water for jet propulsion.

14. In a pedal powered amphibian vehicle equipped with conventional brakes and having a single front wheel and two rear wheels from among only one is a driving wheel; the improvement comprising: rotary air blower coupled to pedal crank arms and driven by them for creating continuous pressurized air stream; a flat turbine wheel provided with reaction blade cavities and coupled to the rear driver wheel for turning it and thereby moving the vehicle; two nozzles connected to said air blower by a flexible double conduit and secured to a movable mounting means adjacent to the turbine reaction blade cavities for directing a stream of air to the cavities to turn the turbine wheel; said movable mounting means including a transversely mounted rod for supporting the nozzles as they are moved along a radius of the turbine wheel to vary the speed ratio between the pedal crank arms and the driver wheel; said vehicle further including a storage spring means operatively associated with said driving wheel for storing energy to be subsequently imparted to said driving wheel when required.

15. A vehicle as claimed in claim 14 further including retractable float means secured to said vehicle.

16. A vehicle as claimed in claim 15 wherein said flexible double conduit is retracted from said nozzles and is positioned beneath the surface of the water for jet propulsion.

17. A vehicle as claimed in claim 14 wherein said turbine wheel is provided with reaction cavities on both the upper and lower faces and wherein two nozzles are connected to the blower, one nozzle adjacent to the upper blade cavities and the other nozzles mounted adjacent to the lower blade cavities.

18. A vehicle as claimed in claim 17 wherein a pair of wires are fastened to said nozzles and coupled to a manual control pulley for moving the nozzles along the transverse rod to vary the speed ratio between pedals and driver wheels, and to provide neutral and reverse; said control pulley having a circular scale indicating neutral, drive and reverse zones, and also the level of each blade cavities channel.

19. A vehicle as claimed in claim 14 wherein two sets of pedals are mounted on the vehicle for use by two passengers, both of said pedal sets mounted on crank arms and coupled by an intermediary set of pulleys to a free-wheeled shaft which is connected to the air blower; said vehicle offering the choice to be easily designed also for four passengers by the addition of two more seats and two more pedals connected to the same shaft.

20. A vehicle as claimed in claim 19 wherein two individual seats are mounted on the vehicle by means of movable pivotal joints, said joints permitting either the approach or retraction of each seat independently from the crank arms as well as the change of the incline of its back.

* * * * *